United States Patent
Harbaugh

(10) Patent No.: US 7,386,086 B1
(45) Date of Patent: Jun. 10, 2008

(54) PRINTED CIRCUIT CARD

(75) Inventor: Thomas D. Harbaugh, Monroeville, PA (US)

(73) Assignee: Westinghouse Electric Co. LLC, Pittsburgh, PA (US)

(*) Notice: Subject to any disclaimer, the term of this patent is extended or adjusted under 35 U.S.C. 154(b) by 187 days.

(21) Appl. No.: 11/242,171

(22) Filed: Oct. 3, 2005

(51) Int. Cl.
*G21C 17/00* (2006.01)

(52) U.S. Cl. ............ 376/259; 376/153; 376/245; 235/492; 324/73.1

(58) Field of Classification Search .......... 376/259, 376/153, 245; 235/153, 492; 324/73.1
See application file for complete search history.

(56) References Cited

U.S. PATENT DOCUMENTS

| | | | |
|---|---|---|---|
| 3,829,842 A * | 8/1974 | Langdon et al. ............ 700/159 |
| 3,892,954 A * | 7/1975 | Neuner ..................... 714/736 |
| 4,399,095 A | 8/1983 | Morris |
| 4,404,625 A * | 9/1983 | Saito et al. ................. 700/15 |
| 4,432,360 A * | 2/1984 | Mumford et al. ............ 607/30 |
| 4,519,078 A * | 5/1985 | Komonytsky ............... 714/728 |
| 4,574,068 A * | 3/1986 | Hill et al. .................. 376/259 |
| 4,661,310 A * | 4/1987 | Cook et al. ................. 376/259 |
| 4,791,358 A * | 12/1988 | Sauerwald et al. ......... 324/73.1 |
| 4,801,803 A * | 1/1989 | Denen et al. ............... 250/336.1 |
| 4,804,515 A | 2/1989 | Crew et al. |
| 4,847,838 A * | 7/1989 | Kralik ....................... 714/43 |
| 5,511,223 A * | 4/1996 | Scecina et al. ............... 714/36 |
| 5,901,279 A * | 5/1999 | Davis, III .................... 714/3 |
| 6,061,412 A | 5/2000 | Stucker et al. |
| 6,167,547 A * | 12/2000 | Senechal et al. ............ 714/732 |

* cited by examiner

*Primary Examiner*—Rick Palabrica

(57) ABSTRACT

A nuclear reactor plant protection system printed circuit card comprises a first logic device having a number of basic logic circuits, and a second logic device operatively connected with the first logic device for testing the number of basic logic circuits without taking the printed circuit card out of service. A nuclear reactor plant protection system printed circuit card comprises a first logic device producing a first output signal in response to a test signal, a second logic device producing a second output signal in response to the test signal, and a comparator for comparing the first output signal and the second output signal, wherein the test signal has a pulse duration that is less than a latching period associated with the printed circuit card. A method of testing and a nuclear reactor control system incorporating the nuclear reactor plant protection system printed circuit card is also provided.

21 Claims, 8 Drawing Sheets

PRINTED CIRCUIT CARD

BACKGROUND

This invention relates generally to printed circuit cards used in a control system and more particularly, to printed circuit cards used within a nuclear reactor protection system.

The generation of electrical power in a nuclear power plant is a complex process. Numerous parameters (such as, without limitation, pressure, temperature, flow, radiation level, valve position, pump status, etc.) must be constantly monitored and measured. These measurements are used by plant operators to regulate the process (e.g., actuate valves, pumps, control rod drive mechanisms, etc.), monitor the process (e.g., monitor tank levels, flows, temperatures, etc.), and provide protection to the equipment used within the process (e.g., prevent low coolant levels, overheating, over pressurization, etc.; trigger a reactor "trip", a unit runback; etc.).

In the case of a nuclear power plant, the protection function, in particular, is very demanding. Thus, nuclear power plants employ a nuclear reactor protection system. To increase reliability of the protection system, redundant sets of critical sensors are provided to measure the numerous process parameters. For instance, four redundant sets of sensors are typically employed to measure a critical parameter, such as reactor core temperature. The sensors may be divided into a number of data channels which are in communication with the nuclear power plant's protection system. If one sensor fails, the three remaining sensors are available to measure the reactor core temperature. To prevent an unintended interruption of normal operations, the signals produced by the redundant sensors are correlated before initiating an emergency or safety response. In the current example, for instance, an indication by at least two out of the four sensors may be required as a prerequisite to actuating an emergency or safety response to lower the reactor core temperature.

Many protection systems employed today are Solid State Protection Systems ("SSPS") which employ discrete digital electronics, mechanical switches, and electromechanical relays, among others. The components of the SSPS are typically arranged in redundant logic "trains" which insures, for example, that the reactor does not inadvertently trip due to a component failure in a single logic train. Instead, the second logic train maintains the proper control. More specifically, if one logic train is off-line, malfunctioning, etc., the other train is able to provide the necessary protection. Examples of protection systems can be found in commonly assigned U.S. Pat. Nos. 6,062,412 issued to Stucker et al., 4,804,515 issued to Crew et al., and 4,399,095 issued to Morris.

Each logic train of the SSPS typically includes a number of printed circuit cards which are used, for example and without limitation, to check the correlation between redundant sensors, check for under-voltage conditions, check for over-voltage conditions, etc. Each train may include, for example and without limitation, thirty-five (35) Universal Logic cards, one (1) Undervoltage Driver card (UV Card), and four (4) Safeguard Driver Cards.

Most existing printed circuit cards, however, employ dated technology. Existing printed circuit cards, for example, operate from a 15 volt power supply and thus consume large amounts of power. Additionally, most existing printed circuit cards do not have adequate indicators (such as LED's) incorporated therein to convey the current status of the card, the inputs/outputs, etc. As a result, troubleshooting of the SPSS is difficult. Generally, the existing printed circuit cards must be periodically tested by taking a single train out of service (i.e., taking it off-line). Once off-line, a series of test pulses are applied to the inputs of the off-line train to test the printed circuit cards in that train; the second train remains on-line and provides protection to the nuclear power plant. After testing is completed, the first train is placed back on-line. Next the second train is taken off-line and a series of test pulses are applied to the inputs of the second train to test its printed circuit cards; the first train remains on-line and provides protection to the nuclear power plant. After testing is completed, the second train in placed back on-line.

Under a typical test protocol, the trains are alternatingly tested every three to six months. For example, train-1 is tested in January, train-2 is tested in April, train-1 is tested in July, and train-2 is tested in October. As is evident, each train only undergoes testing once every six months. Thus, a malfunction that occurs shortly after a train is tested may not be discovered until the next scheduled test for that train (e.g., six months later; or even worse, only discovered after the train has caused an inadvertent reactor trip). Newer protection systems may be available; however, a wholesale change out of the protection system is cost prohibitive and complicated.

Consequently, there is a need in the art for an improved printed circuit cards for an existing SSPS. More particularly, there is a need in the art for improved printed circuit cards that provide high reliability, low power consumption, which may be incorporated as a direct replacement to existing cards, and which provides continuous self-testing, among others.

SUMMARY

One aspect of the present invention relates to a nuclear reactor plant protection system printed circuit card comprising a first logic device having a number of basic logic circuits, and a second logic device operatively connected with the first logic device for testing the number of basic logic circuits without taking the printed circuit card out of service.

Another aspect of the present invention relates to a nuclear reactor plant protection system printed circuit card comprising a first logic device having a number of basic logic circuits structured to produce a first output signal in response to a test signal, a second logic device having a number of basic logic circuits structured to produce a second output signal in response to the test signal, and a comparator for comparing the first output signal and the second output signal; wherein the test signal has a pulse duration that is less than a latching period associated with the printed circuit card.

Another aspect of the present invention relates to a method for testing a printed circuit card without taking the printed circuit card out of service, the printed circuit card having a first logic device including a number of basic logic circuits structured to produce a first output signal and a second logic device including a number of basic logic circuits structured to produce a second output signal, the basic logic circuits of the second logic device being substantially the same as the basic logic circuits of the first logic device. The method comprises receiving a test signal having a pulse duration at an input of the first logic device; wherein the basic logic circuits of the first logic device include a component having a latching period, the latching period being greater than the pulse duration, receiving the test signal at an input of the second logic device, and comparing the first output to the second output.

Another aspect of the present invention relates to a nuclear reactor control system comprising a plurality of sensors structured to measure numerous process parameters of a nuclear reactor and to produce a sensor output signal in response thereto, a nuclear reactor protection system having a printed circuit card electrically connected to at least some of the plurality of sensors and structured to receive the sensor output signal from each of the at least some of the plurality of sensors. The printed circuit card comprises a first logic device having a number of basic logic circuits, and a second logic device operatively connected with the first logic device for testing the number of basic logic circuits without taking the printed circuit card out of service.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The expression "a number of" and variations thereof, as employed herein, shall refer broadly to any quantity, including a quantity of one.

Figure 1:
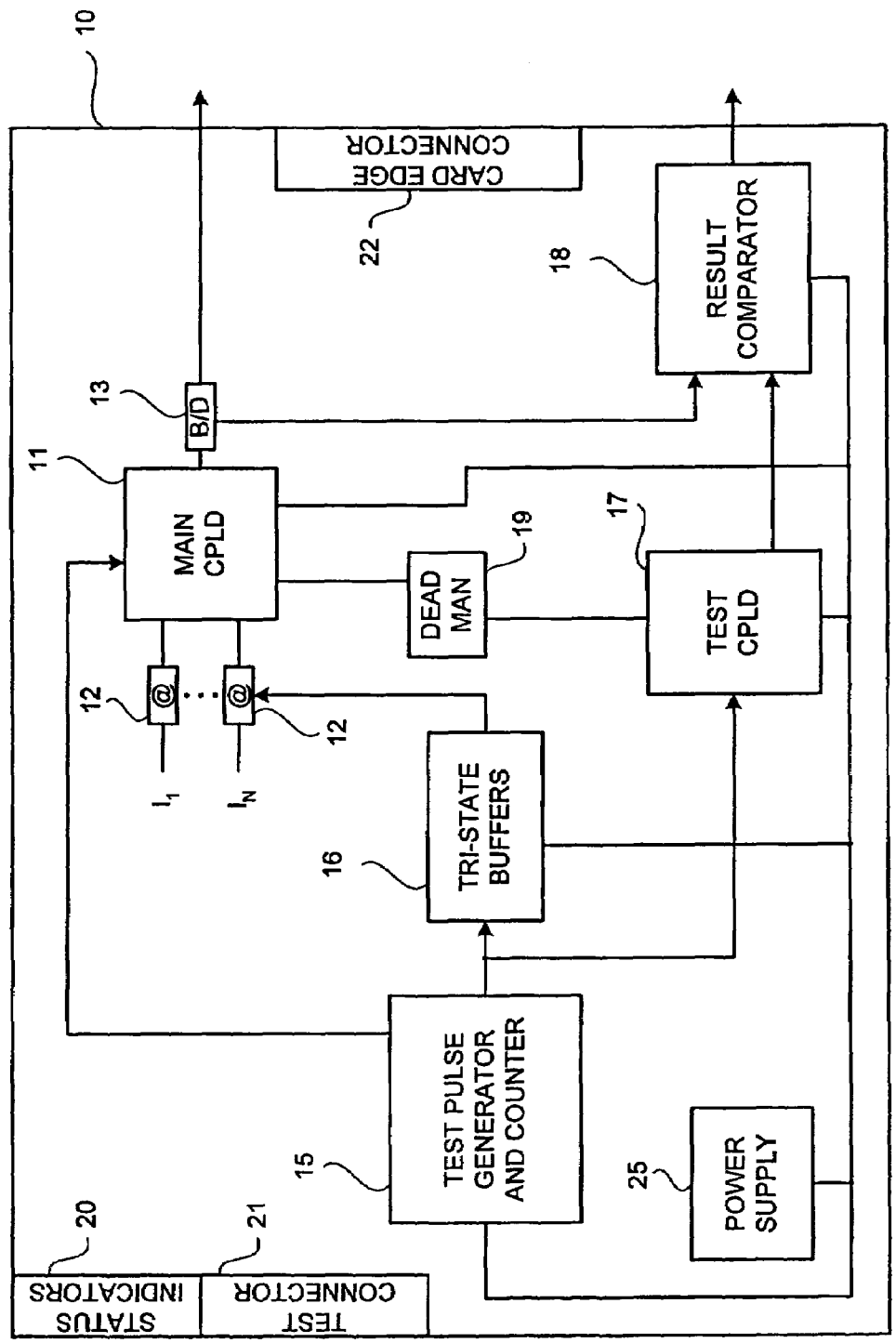
FIG. 1 is a block diagram of a printed circuit card for use in a protection system according to one embodiment of the present invention.

FIG. 1 is a block diagram of a printed circuit card 10 according to one embodiment of the present invention. The printed circuit card 10 is structured to be used, for example and without limitation, in a nuclear reactor protection system (e.g., an SSPS). More specifically, the printed circuit card 10 is structured to have the same basic functions, the same dimensions, the same interfaces, etc. as the existing printed circuit cards that it is intended to replace. For instance, the printed circuit card is structured to have the same basic functions, the same dimensions, the same interfaces, etc. as an existing safeguards driver card, an existing universal logic card, an existing undervoltage driver card, etc.

Referring to FIG. 1, the printed circuit card 10 includes a main complex programmable logic device (main CPLD) 11, a test complex programmable logic device (test CPLD) 17, a test pulse generator and counter 15, tri-state buffers 16, result comparator 18 and power supply 25, among others. A card edge connector 22 is provided which allows the printed circuit card 10 to interface with the existing nuclear reactor protection system. For instance, a printed circuit card 10 structured to replace a universal driver card in one train of an SSPS will include a card edge connector 22 that is substantially the same as the universal driver card being replaced. The printed circuit card 10 includes status indicators 20 and additional test connectors for electrically connecting the printed circuit card to, for example, an external test apparatus.

The main CPLD 11 includes a number of inputs ($I_1 \ldots I_N$), each having a signal attenuator 12 associated therewith and a number of basic logic circuits (not shown in FIG. 1). The inputs ($I_1 \ldots I_N$) are structured to receive signals, for example, from the numerous sensors which measure the process parameters associated with the power generation process. The number of basic logic circuits are structured to complete certain functions (e.g., 2/4 logic operations, 2/3 logic operations, multiplexer operations, AND operations, OR operations, driver operations, etc.) for producing an output signal which is provided to an associated buffer/driver 13.

The test CPLD 17 is operatively connected with the main CPLD 11. The test CPLD 17 permits the number of basic logic circuits of the main CPLD 11 to be tested while the main CPLD 11 remains in service (i.e., without taking the main CPLD 11, or the train of which it is a part, off-line). In the current embodiment, for example, the test CPLD 17 includes a number of basic logic circuits (not shown) which are substantially the same as the number of basic logic circuits of the main CPLD 11. As a result, the logic circuits of the test CPLD 17 are structured to implement the same function as the main CPLD 11. The logic circuits of the test CPLD 17 are structured to produce a second output signal.

During testing, the test pulse generator and counter 15 cycles through a number of test steps and generates a number of test pulses. For each test step, various signals of a logic test pattern are applied to each input ($I_1 \ldots I_N$) of the main CPLD 11 through tri-state buffers 16. The various signals of the logic test pattern are capacitively coupled to each input ($I_1 \ldots I_N$) via the associated attenuator 12 and override the normal input signal for an approximately 2 μS (i.e., $2 \times 10^{-6}$ seconds) test period. The same signals of the logic test pattern are applied to the inputs of test CPLD 17. The output signal produced by the main CPLD 11 in response to the logic test pattern is compared by comparator 18 to the output signal produced by the test CPLD 17 in response to the logic test pattern. If the output of the main CPLD 111 fails to match the output of the test CPLD 17, an indication is provided (for example, with status indicators 20) that one set of basic logic circuits (i.e., either the basic logic circuits of main CPLD 11 or the basic logic circuits of test CPLD 17) is in error.

As discussed above, the test pulses have a duration of approximately 2 μS (i.e., $2 \times 10^{-6}$ seconds). Because relays on the printed circuit card 10 (not shown) require approximately 12 mS (i.e., $12 \times 10^{-3}$ seconds) to latch, the use of the 2 μS test pulse (which has a duration over 1000 times shorter than the latch time) insures that the test pulses do not propagate from the printed circuit card 10 to another printed circuit card within the train.

Additionally, a filter (not shown) may be added to the output of the printed circuit card 10 to further insure that the test pulses do not propagate through the train. For example, in the current embodiment, the output buffer/driver 13 may be tested as part of the sequence of tests discussed above. When buffer/driver 13 is used as a driver, the buffer/driver 13 is designed to filter out the two 2 µS test pulses. More specifically, an approximately 256 µS test pulse (which is over 100 times longer than the 2 µS test pulse) is applied to turn off the output transistor of the buffer/driver 13 (or the driver output FET of the buffer/driver 13) one at a time. The output voltage of the buffer/driver 13 is measured to ensure that there is no output voltage present. If there is an output voltage present and the buffer/driver 13 is not turned on by the main CPLD 11, one of the output devices of the buffer/driver 13 is shorted and an error is generated. Also, if the buffer/driver 13 is activated and there is no output voltage an error is generated.

As discussed above, the main CPLD 11 can be tested while the printed circuit card 10 remains in service. In the current embodiment, the main CPLD 11 is continuously tested when in service. More specifically, the main CPLD 11 is tested at least once a second without forcing the main CPLD 11 off-line.

The printed circuit card 10 may also include a "dead man" circuit 19. The dead man circuit 19 is operatively connected with the main CPLD 11 and the test CPLD 17. The dead man circuit 19 is structured to permit the main CPLD 11 to verify that the test CPLD 17 is operating correctly. More specifically, the dead man circuit is structured to receive a test signal from the main CPLD 11, generate a response indicative of the status of the test CPLD 17, and transmit the response back to the main CPLD 11. Responsive to the response signal generated by the dead man circuit, the main CPLD 11 provides an indication (for example, at status indicators 20) if the test CPLD 17 is not functioning properly.

In the current embodiment, status indicators 20 include a number of LEDs which display the status of the card itself, the inputs, the outputs, etc. For example, the printed circuit card 10 includes a "heartbeat" LED which flashes at a constant rate to indicate that the printed circuit card 10 is powered-up and operating correctly. As a result of the status indicators 20, troubleshooting procedures are simplified.

Figure 2:
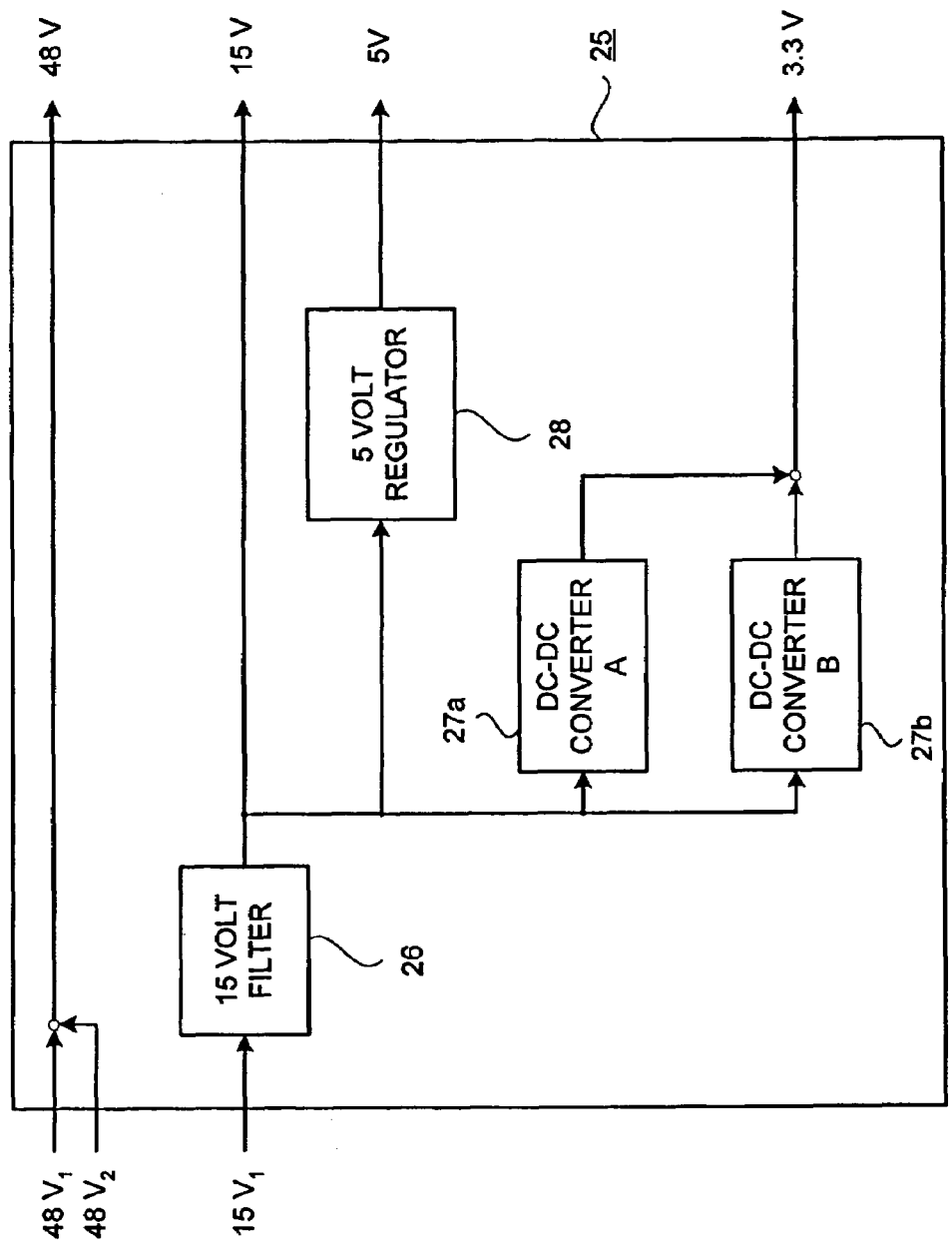
FIG. 2 is a block diagram of the power supply used by the printed circuit board 10 of FIG. 1.

To reduce power consumption, most of the components of the printed circuit card 10 are operated at 3.3 volts. Because the printed circuit board 10 is a one-to-one replacement for an existing printed circuit card which operates at 15 volts, power supply 25 is structured to convert the 15 volt power supplied to the existing printed circuit cards to 3.3 volts for use by the printed circuit card 10. FIG. 2 is a block diagram of the power supply 25 used by the printed circuit board 10 of FIG. 1. The power supply 25 includes a filter 26, redundant DC-DC converters 27a, 27b, and a regulator 28. In the current embodiment, the existing 15 volt power signal is conditioned/filtered by filter 26. The output of the filter 26 is electrically connected to a 15 volt output pin, to the input of DC-to-DC converter 27a, to the input of DC-to-DC converter 27b, and to the input of regulator 28. The DC-to-DC converter 27a and the DC-to-DC converter 27b each convert the 15 volt power signal to 3.3 volts for use by the printed circuit board 10. The DC-to-DC converter 27a and the DC-to-DC converter 27b provide a redundant 3.3 volt supply. Regulator 28 provides a 5 volt power supply to the printed circuit card 10. Dual 48 volt supplies (48V1 and 48V2) are connected to power supply 25 and a single 48 volt output is provided for use by the printed circuit card 10.

Figure 3:
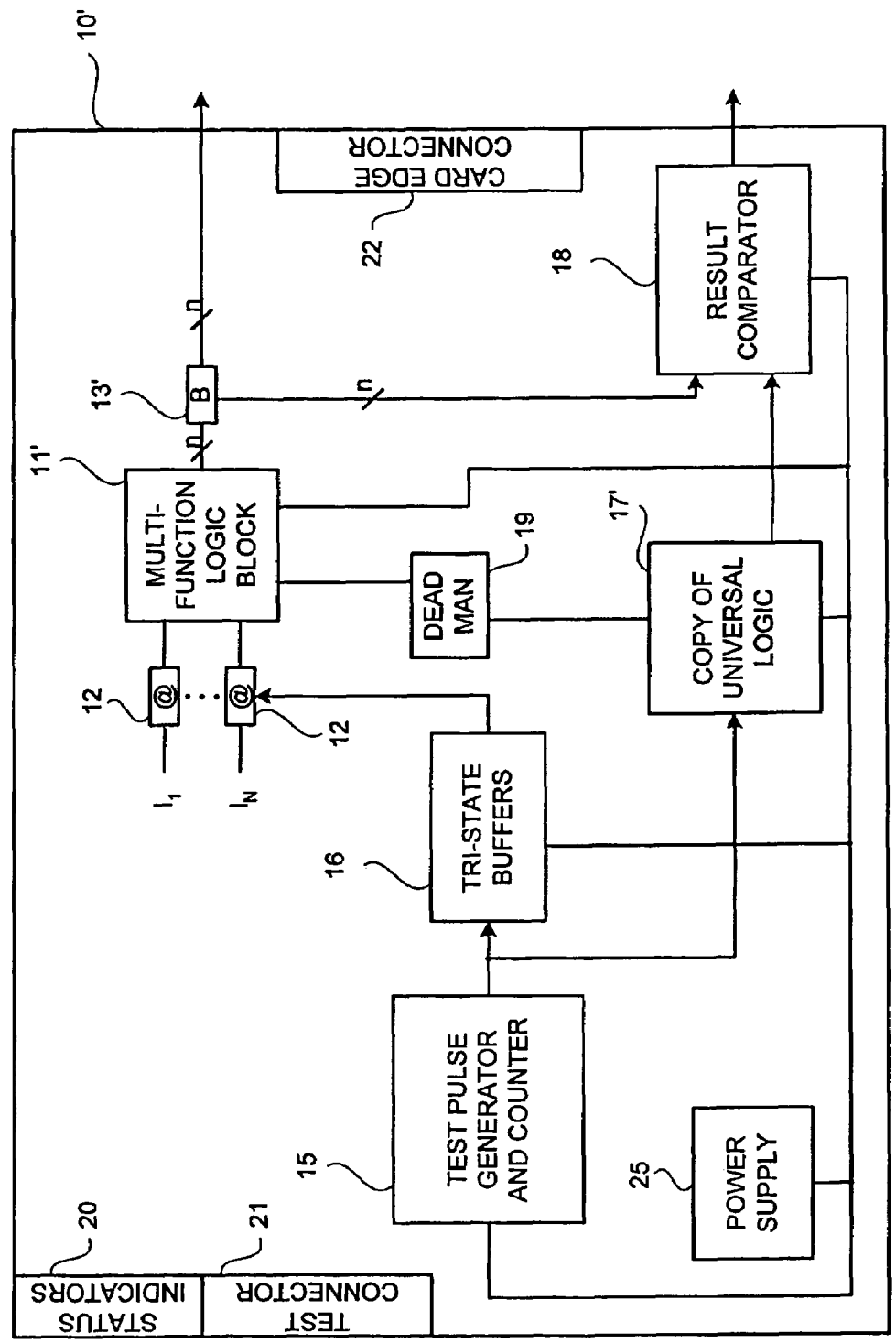
FIG. 3 is a block diagram of a Universal Logic Board printed circuit card.
Figure 4:
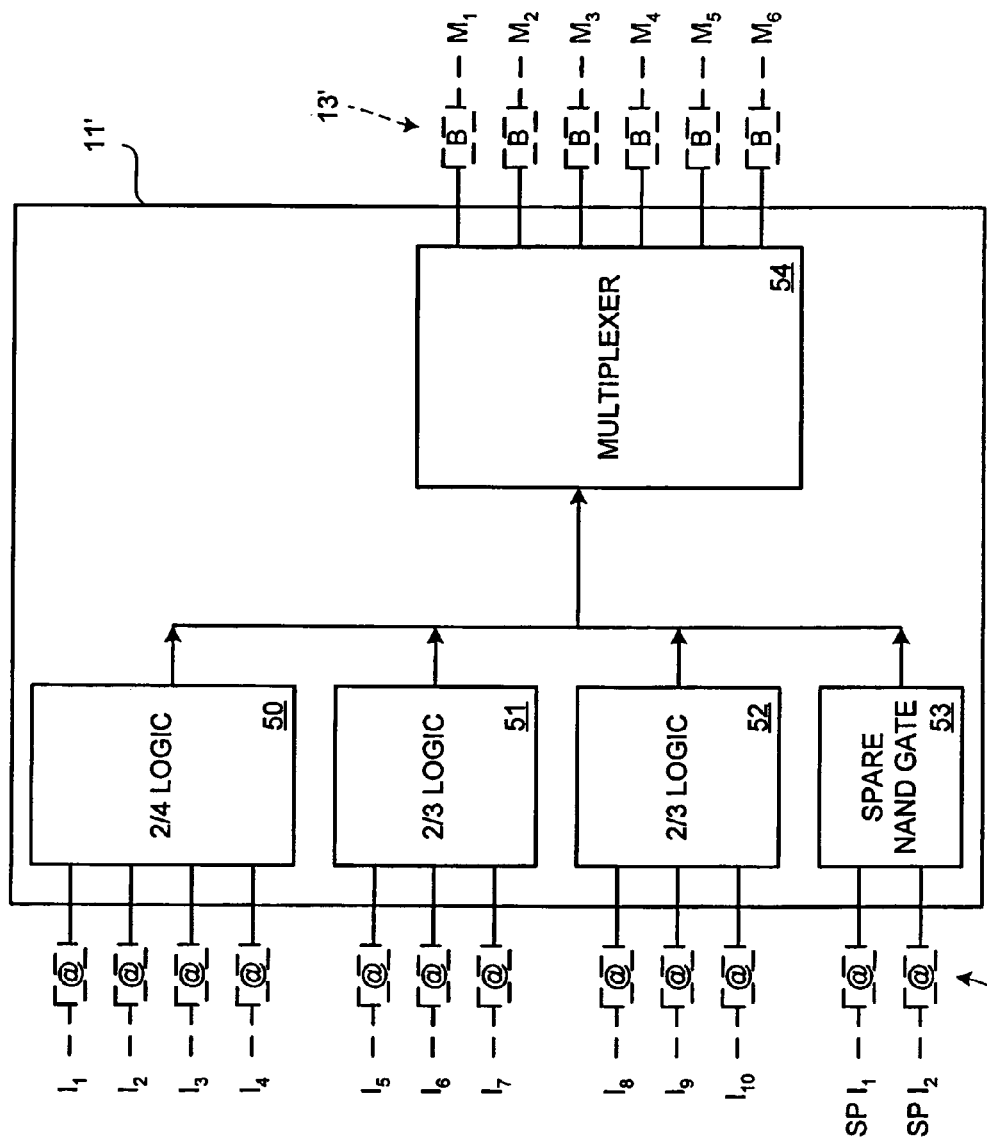
FIG. 4 illustrates the main CPLD of the Universal Logic Board printed circuit card of FIG. 3 according to one embodiment.

FIG. 3 is a block diagram of a printed circuit card 10' structured to function as a Universal Logic Board according to one embodiment. FIG. 4 illustrates the main CPLD 11' of the Universal Logic Board printed circuit card 10' of FIG. 3 according to one embodiment. Referring to FIG. 4, the Universal Logic Board printed circuit card 10' includes a main CPLD 11' having basic logic circuits for implementing five logic blocks. The basic logic functions are implemented in main CPLD 11', with supporting discrete components (not all of which are shown) on the printed circuit card 10'. The main CPLD 11' implements 4-input logic block 50, a 3-input logic block 51, a 3-input logic block 52, a 2-input logic block 53, and a 6 output multiplexer block 54. The 4-input logic block 50 receives inputs $I_1$-$I_4$; the 3-input logic block 51 receives inputs $I_5$-$I_7$, the 3-input logic block 52 receives inputs $I_8$-$I_{10}$, and the 2-input logic block 53 receives inputs SP $I_1$-$I_2$. Each input (i.e., $I_1$-$I_{10}$ and SP $I_1$-SP $I_2$) has an attenuator 12 associated therewith.

In the current embodiment, the Universal Logic Board printed circuit card 10' is active logic low. The 4-input logic block provides a low output when any 2 of its 4 inputs are low, each of the 3-input logic blocks provide a low output when any 2 of their 3 inputs are low, and the 2-input logic block provides a high output when any 1 of its 2 inputs are low. Signals from the 4, 3, and 2 input logic blocks (i.e., 50, 51, 52, 53) are routed to outputs $M_1$-$M_6$ by multiplexer 54. Each output of multiplexer 54 has a buffer 13' associated therewith. The outputs $M_1$-$M_6$ may be displayed, for example, by the plant protection system.

Referring to FIG. 3, it should be noted that the test CPLD 17' includes substantially the same basic logic circuits for implementing the five basic logic functions that are implemented in main CPLD 11'. During testing, the same signals of the logic test pattern are applied to the inputs of test CPLD 17'. The output signal produced by the main CPLD 11' in response to the logic test pattern is compared by comparator 18 to the output signal produced by the test CPLD 17' in response to the logic test pattern. If the output of the main CPLD 11' fails to match the output of the test CPLD 17', an indication is provided (for example, with status indicators 20) that one set of basic logic circuits (i.e., either the basic logic circuits of main CPLD 11' or the basic logic circuits of test CPLD 17') is in error.

It should further be noted that all inputs and outputs of the Universal Logic Board printed circuit card 10' are structured to be of the same logic level and impedance as the existing Universal Logic Board printed circuit card being replaced. It should be apparent that additional or alternative logic functions may be implemented on the Universal Logic Board printed circuit card 10' while remaining within the scope of the present invention.

Figure 5:
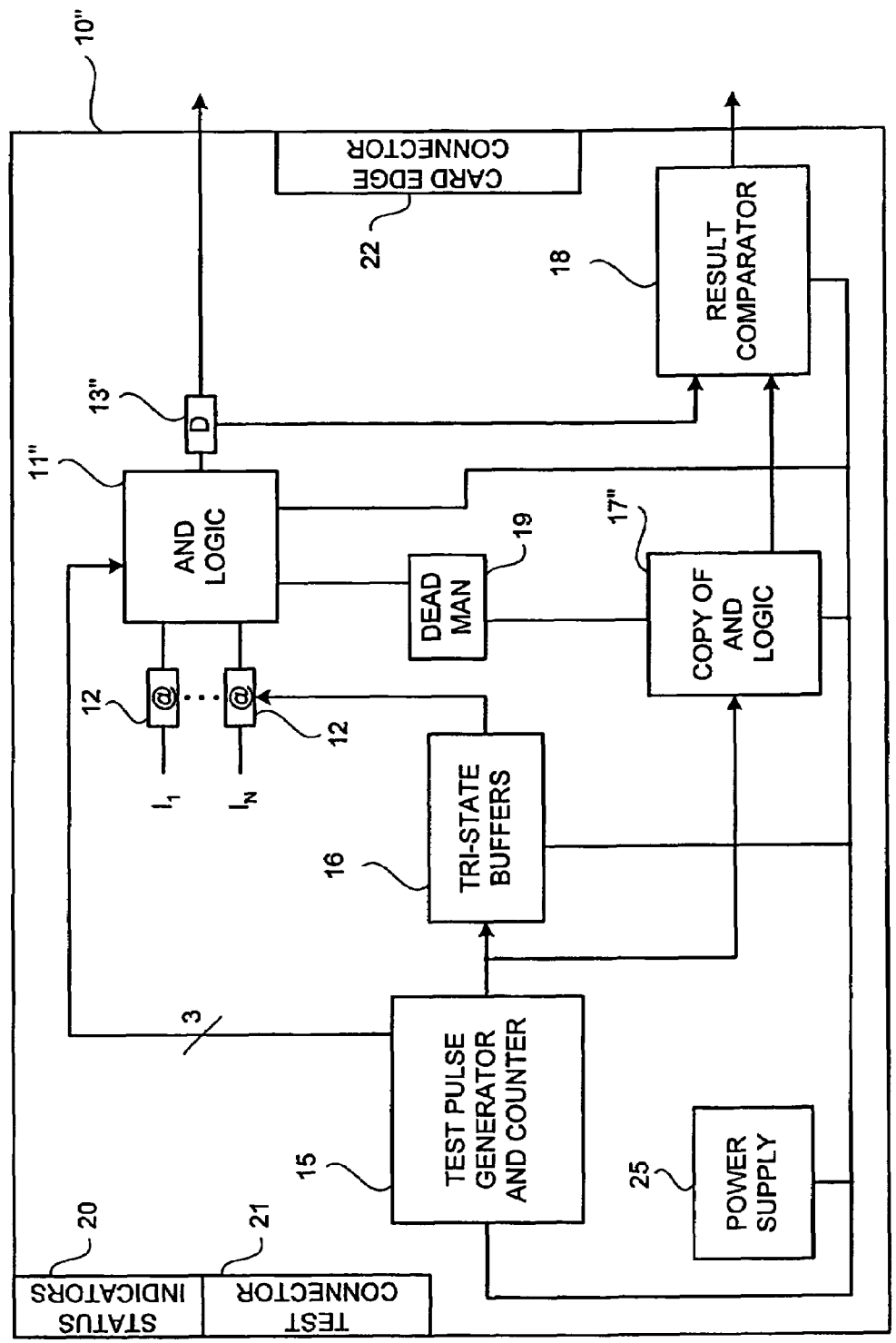
FIG. 5 is a block diagram of an Undervoltage Driver Board printed circuit card.
Figure 6:
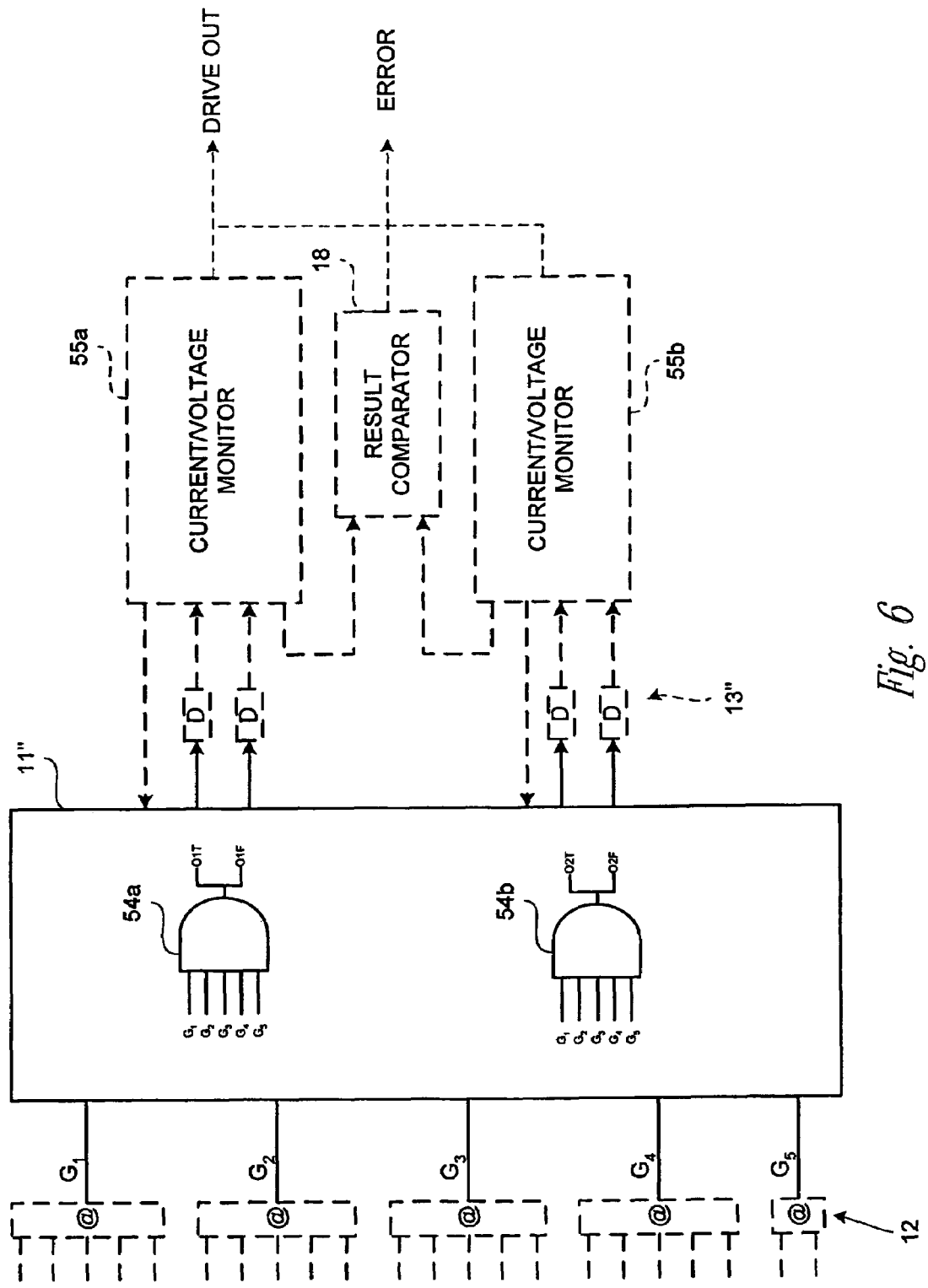
FIG. 6 illustrates the main CPLD of the Undervoltage Driver Board printed circuit card of FIG. 5 according to one embodiment.

FIG. 5 is a block diagram of an Undervoltage Driver Board printed circuit card 10" according to one embodiment. FIG. 6 illustrates the main CPLD 11" of the Undervoltage Driver Board printed circuit card 10" of FIG. 5 according to one embodiment. The basic logic functions are implemented in main CPLD 11", with supporting discrete components (not all of which are shown) on the printed circuit card 10".

Referring to FIG. 6, the Undervoltage Driver Board printed circuit card 10" includes a main CPLD 11" having basic logic circuits for implementing an "AND" logic function and a current limit retry logic function. More specifically, a number of signals are divided into five input groups $G_1$-$G_5$; each of which are provided at the inputs of AND gates 54a and to the inputs of AND gate 54b. The output of AND gate 54a is provided to a current/voltage monitor 55a via drivers 13". Likewise, the output of AND gate 54b is provided to a current/voltage monitor 55b via drivers 13". An output of the current/voltage monitor 55a and an output of the current/voltage monitor 55b are compared by comparator 18 which produces an error signal when the actual output being monitored differs from the test injected expected output. If the output becomes low impedance (e.g. short circuited), the driver circuit will experience an over-current condition that can damage electronic components on the driver card. During the over current condition, the current monitor turns off the output driver to prevent damage to the driver circuit. The current monitor tests for an over-current condition and retries the output circuit on a periodic basis. Once the over-current condition is eliminated, the driver circuit returns to normal operation.

Referring to FIG. 5, it should be noted that the test CPLD 17" includes substantially the same basic logic circuits for implementing the "AND" logic function and the current limit retry logic function which are implemented in main CPLD 11". During testing, the same signals of the logic test pattern are applied to the inputs of test CPLD 17". The output signal produced by the main CPLD 11" in response to the logic test pattern is compared by comparator 18 to the output signal produced by the test CPLD 17" in response to the logic test pattern. If the output of the main CPLD 11" fails to match the output of the test CPLD 17", an indication is provided (for example, with status indicators 20) that one set of basic logic circuits (i.e., either the basic logic circuits of main CPLD 11" or the basic logic circuits of test CPLD 17") is in error.

It should further be noted that all inputs and outputs of the Undervoltage Driver Board printed circuit card 10" are structured to be of the same logic level and impedance as the existing Undervoltage Driver Board printed circuit card being replaced. It should be apparent that additional or alternative logic functions may be implemented on the Undervoltage Driver Board printed circuit card 10" while remaining within the scope of the present invention.

Figure 7:
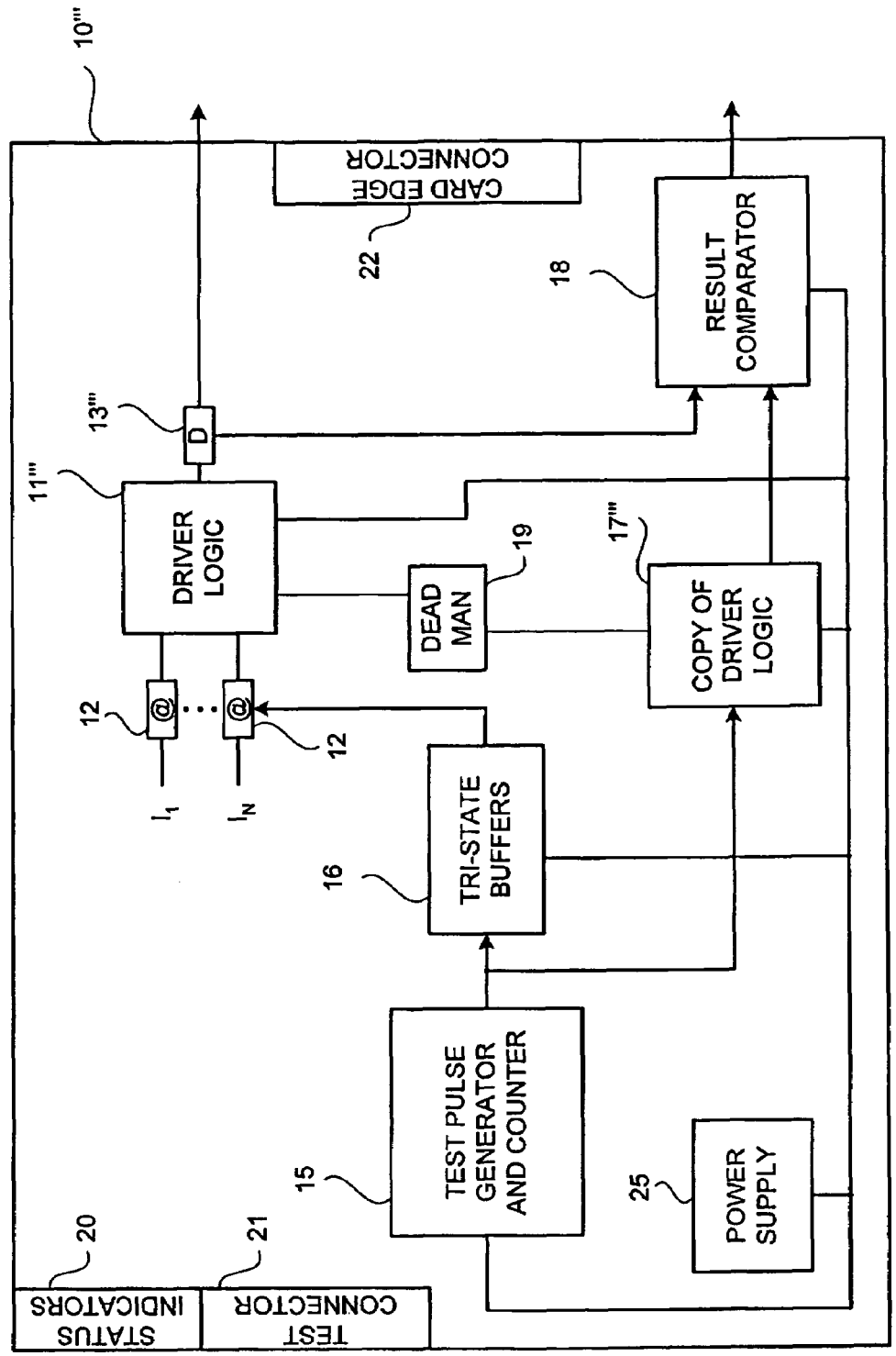
FIG. 7 is a block diagram of a Safeguards Driver Board printed circuit card.
Figure 8:
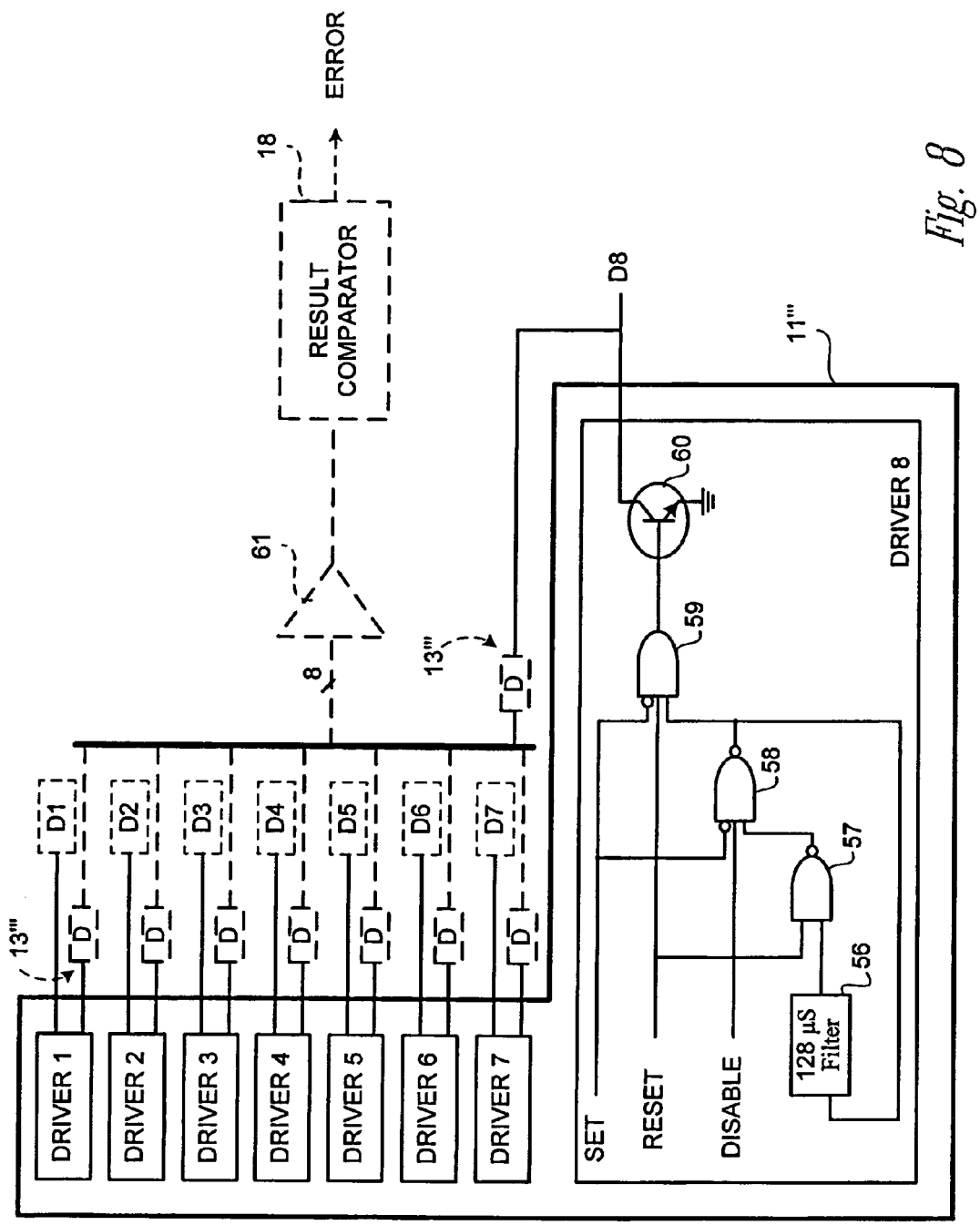
FIG. 8 illustrates the main CPLD of the Safeguards Driver Board printed circuit card of FIG. 7 according to one embodiment.

FIG. 7 is a block diagram of a Safeguards Driver Board printed circuit card 10''' according to one embodiment. FIG. 8 illustrates the main CPLD 11''' of the Safeguards Driver Board printed circuit card 10''' of FIG. 7 according to one embodiment. Referring to FIG. 8, the Safeguards Driver Board printed circuit card 10''' includes a main CPLD 11''' having basic logic circuits for implementing eight driver circuits with latch reset (e.g., driver-1 thru driver-8). The basic logic functions are implemented in main CPLD 11''', with supporting discrete components (such as driver current/voltage monitors 61, but not all of which are shown) on the printed circuit card 10'''. Although each driver (i.e., driver-1 thru driver-8) includes the same components, for simplicity, exemplary logic is illustrated only for driver-8.

Driver-8 includes a filter 56, two NAND gates 57-58, an AND gate 59 and a transistor 60. The reset memory function is performed by the two NAND gates 57-58, which provide the latching function on reset by taking the output of NAND gate 58 and feeding it back to the input of NAND gate 57 through filter 56. Filter 56 prevents noise glitches from resetting the driver output by setting the latch and acts like a typical RC filter but is implemented in the main CPLD 11''' by using an up/down counter that emulates the charging and discharging of a capacitor. The output of NAND gate 58 is also provided to and input of AND gate 59. The output of AND gate 59 drives the gate of output driver transistor 60. The output of each driver circuit (e.g., driver-1 thru driver-8) is fed to an associated driver 13'''. An output of each driver 13''' is provided, via its associated driver current monitor 61, to the comparator 18.

The test CPLD 17''' includes substantially the same basic logic circuits for implementing the driver logic function as main CPLD 11'''. The output of the test CPLD 17''' is also provided to the comparator 18. During testing, the same signals of the logic test pattern are applied to the inputs of test CPLD 17'''. The output signal produced by the main CPLD 11''' in response to the logic test pattern is compared by comparator 18 to the output signal produced by the test CPLD 17''' in response to the logic test pattern. If the output of the main CPLD 11''' fails to match the output of the test CPLD 17''', an indication is provided (for example, with status indicators 20) that one set of basic logic circuits (i.e., either the basic logic circuits of main CPLD 11''' or the basic logic circuits of test CPLD 17''') is in error.

It should further be noted that all inputs and outputs of the Safeguards Driver Board printed circuit card 10''' are structured to be of the same logic level and impedance as the existing Safeguards Driver Board printed circuit card being replaced. It should be apparent that additional or alternative logic functions may be implemented on the Safeguards Driver Board printed circuit card 10''' while remaining within the scope of the present invention.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A nuclear reactor plant protection system printed circuit card comprising:
a first logic device having a first input, a first output and a number of basic logic circuits operatively connected between the first input and the first output;
a second logic device having a second input, a second output and substantially the same basic logic circuits as the first logic device, operatively connected between the second input and the second output, the second logic device being operatively connected with said first logic device;
a test pulse generator operatively connected to the first input and the second input for providing short test pulses for automatically testing said number of basic logic circuits without taking said printed circuit card out of service, the test pulses overriding any other signal at the first input; and
a comparator operatively connected to the first output and the second output for comparing a signal at the first output with a signal at the second output and identifying when the signal at the first output does not match the signal at the second output.

2. The printed circuit card of claim 1 wherein said number of basic logic circuits are continuously tested without taking said printed circuit card out of service.

3. The printed circuit card of claim 1 wherein said number of basic logic circuits are tested at least once a second without taking said printed circuit card out of service.

4. The printed circuit card of claim 1 further comprising a third circuit operatively connected with said first logic device and said second logic device, said third circuit structured to permit said first logic device to verify the operation of said second logic device.

5. The printed circuit card of claim 1 wherein said printed circuit card is one of a safeguards driver card, a universal logic card, or an undervoltage driver card.

6. The printed circuit card of claim 1 further comprising a power supply structured to convert a first voltage to a second voltage for use by said printed circuit card.

7. The printed circuit card of claim 1 wherein said first logic device is a main complex programmable logic device and wherein said second logic device is a test complex programmable logic device.

8. A nuclear reactor plant protection system printed circuit card comprising:
- a first logic device having a number of basic logic circuits structured to produce a first output signal in response to a test signal;
- a second logic device having a number of basic logic circuits substantially the same as the first logic device, the second logic device being structured to produce a second output signal in response to said test signal; and
- a comparator for comparing said first output signal and said second output signal;
- wherein said test signal has a pulse duration that is less than a latching period associated with said printed circuit card.

9. The printed circuit card of claim 8 wherein said test signal is applied to said first and second logic devices and said first and second output signals are compared without taking said printed circuit card out of service.

10. The printed circuit card of claim 8 wherein said printed circuit card is one of a safeguards driver card, a universal logic card, or an undervoltage driver card.

11. The printed circuit card of claim 8 further comprising a test pulse generator and counter structured to produce said test pulse.

12. The printed circuit card of claim 8 further comprising a power supply structured to convert a first voltage to a second voltage for use by said printed circuit card.

13. The printed circuit card of claim 8 further comprising a third circuit operatively connected with said first logic device and said second logic device and structured to permit said first logic device to verify the operation of said second logic device.

14. The printed circuit card of claim 8 wherein said first logic device is a main complex programmable logic device and said second logic device is a test complex programmable logic device.

15. A nuclear reactor control system comprising:
- a plurality of sensors structured to measure numerous process parameters of a nuclear reactor and to produce a sensor output signal in response thereto;
- a nuclear reactor protection system having a printed circuit card electrically connected to at least some of said plurality of sensors and structured to receive said sensor output signal from each of said at least some of said plurality of sensors, said printed circuit card comprising:
  - a first logic device having a first input, a first output and a number of basic logic circuits operatively connected between the first input and the first output;
  - a second logic device having a second input, a second output and substantially the same basic logic circuits as the first logic device, operatively connected between the second input and the second output, the second logic device being operatively connected with said first logic device;
  - a test pulse generator operatively connected to the first input and the second input for providing short test pulses for automatically testing said number of basic logic circuits without taking said printed circuit card out of service, the test pulses overriding any sensor signal at the first input; and
  - a comparator operatively connected to the first output and the second output for comparing a signal at the first output with a signal at the second output and identifying when the signal at the first output does not match the signal at the second output.

16. The nuclear reactor control system of claim 15 wherein said number of basic logic circuits are continuously tested without taking said printed circuit cards out of service.

17. The nuclear reactor control system of claim 15 wherein said wherein said number of basic logic circuits are tested at least once a second without taking said printed circuit card out of service.

18. The nuclear reactor control system of claim 15 wherein said printed circuit card further comprising a third circuit operatively connected with said first logic device and said second logic device, said third circuit structured to permit said first logic device to verify the operation of said second logic device.

19. The nuclear reactor control system of claim 15 wherein said printed circuit card is a safeguards driver card, a universal logic card, or an undervoltage driver card.

20. The reactor control system of claim 15 wherein said printed circuit card further comprises a power supply structured to convert a first voltage to a second voltage for use by said printed circuit card.

21. The nuclear reactor control system of claim 15 wherein
- said basic logic circuits of said first logic device include an associated component having a latching period, said latching period being greater than said test pulse duration.

* * * * *